May 6, 1952 — W. C. ANDERSON — 2,595,220
PRODUCTION AND UTILIZATION OF CONTROL SIGNALS
Filed March 30, 1949 — 3 Sheets-Sheet 1

INVENTOR
WILMER C. ANDERSON

May 6, 1952 W. C. ANDERSON 2,595,220
PRODUCTION AND UTILIZATION OF CONTROL SIGNALS
Filed March 30, 1949 3 Sheets-Sheet 3

INVENTOR
WILMER C. ANDERSON
BY

ATTORNEY

Patented May 6, 1952

2,595,220

UNITED STATES PATENT OFFICE 2,595,220

PRODUCTION AND UTILIZATION OF CONTROL SIGNALS

Wilmer C. Anderson, Greenwich, Conn., assignor to Deering Milliken Research Trust, Greenwich, Conn., a nonprofit trust of Maine Application March 30, 1949, Serial No. 84,447

24 Claims. (Cl. 57—38)

The present invention relates to methods and means for producing and utilizing control signals and comprises a novel control system which, although of general application, is particularly adapted for control of a textile spinning frame for production of yarn having slubs therein. The invention will, therefore, be described with specific reference to such application.

In general the method of the invention comprises the creation and recording of a sequence of control signals, the signals being of random or of constant length as desired and of random or controlled occurrence as desired and the subsequent utilization of the recordings for control of a mechanism, preferably a yarn spinning mechanism. In accordance with the preferred method of the invention, the control signals are produced and recorded at a rate substantially higher than that at which they are to be used in the control operation, in order that a relatively short record may be used for a long period of control.

In the preferred embodiment of the invention that part of the novel control system comprising the means for creating and recording a sequence of control signals includes the following features:

A circuit responsive to randomly occurring phenomena for creating control pulses and means for transforming such pulses into control signals of constant or of random length as desired;

Adjustable means associated with the above mentioned circuit for controlling the minimum interval between signals;

Adjustable means for adjusting the minimum duration of the control signals;

Automatic means adapted to introduce control signals when the interval between pulses is longer than a predetermined value; and Recording means selectively connected to receive and record random signals of constant or of random duration or operator controlled signals as desired.

The recording means of the system may be one which produces a permanent record, such as a phonograph disk, or a permanent but erasible record, such as a magnetic record. A record on magnetic tape, for example, permits of monitoring and dubbing, in the event some change in the pattern of produced signals is desired. Either type of record may be used for control of the spinning or other mechanism. In the particular embodiment of the invention hereinafter described, the control signals are recorded either directly, or as a recording, on to phonograph type disks and on both sides thereof so that by playing back the records on a machine equipped with conventional record changing means, substantially continuous control operation may be obtained.

That part of the control system of the invention comprising the means responsive to the recorded signals has, in the preferred embodiment of the invention, the following features:

A circuit which amplifies the signals picked up from the record, suppresses noise therein, and, through suitable relays, causes energization of a controlling solenoid for the duration of each control signal, the solenoid when energized permitting coupling of a high speed drive shaft to the feed rolls of a spinning mechanism as hereinafter described;

A frame stop motion connected to the amplifying circuit for shutting down the spinning frame upon failure of any part of the circuit or when the time between signals exceeds a predetermined value; and Safety devices and circuits associated with the system and including delay means for initiating operation of the system and of the spinning frames in the proper sequence.

Additionally the invention includes a convenient arrangement for simultaneously controlling a plurality of spinning frames from a central point from which emanate control signals from one or several records. The arrangement is such as to permit of ready control of any frame or group of frames by the signals from any particular record.

The above, somewhat generally, described system of the invention will be better understood by reference to the accompanying drawings illustrating a specific embodiment.

Figure 1:
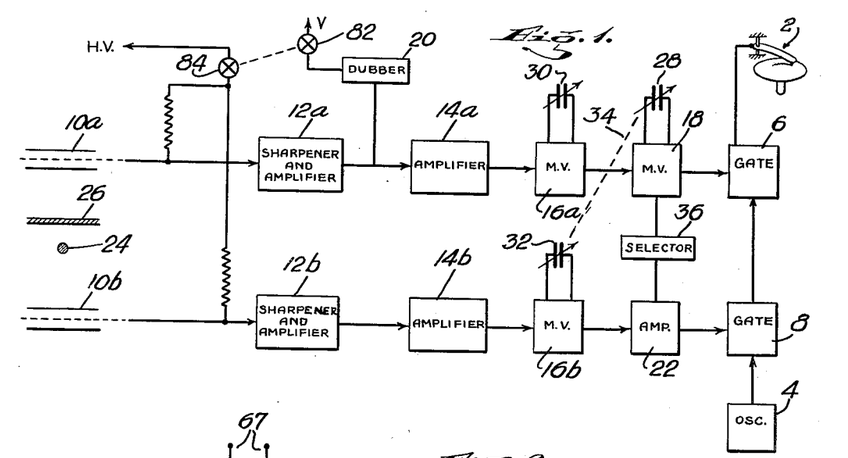
Fig. 1 is a block diagram of the control signal producing and recording means of a control system embodying the invention.
Figures 4, 5:
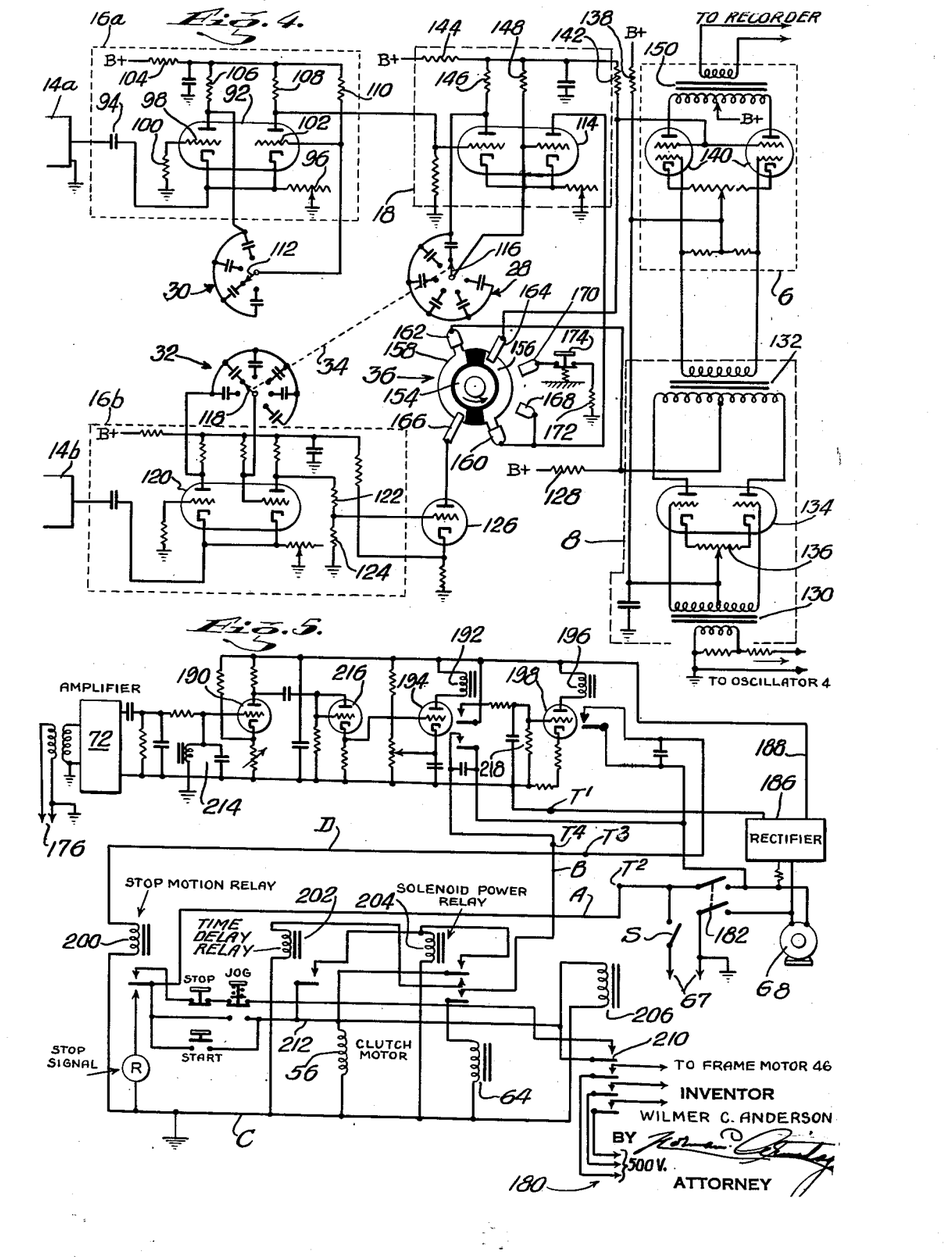
Fig. 4 is a circuit diagram of the elements of Fig. 1 which permit of adjustment both of the minimum interval between signals and of the minimum duration of the signals and permit of the selection as between signals of constant or of random duration.
Fig. 5 is a diagram of the electrical elements of Fig. 2.

The new control system will first be described with reference to Figs. 1 and 2. The part of the system in which the signals are produced and recorded, as shown in Fig. 1, includes a recording device 2 indicated as of the recording disk type, which is connected to receive and record electrical oscillations of constant frequency from an oscillator 4. A pair of electronic gates, 6 and 8, the circuits of which will be described with reference to Fig. 4, are included in the connection between the oscillator 4 and recorder 2 so that oscillations are impressed upon the recorder only when both gates are open. Gate 6 is the terminus of a series of elements forming a channel hereinafter called the "low" channel and gate 8 is the terminus of a second series of elements forming a "high" channel, gate 6 being opened when a control pulse is delivered thereto from the "low" channel and gate 8 being closed when a control pulse is delivered thereto from the "high" channel. The terms "low" and "high" as applied to the channels, refer, as hereinafter appears, to the relative average rate at which pulses are impressed upon the two channels and not to difference in time constants of the circuit elements making up the channels.

The "low" channel comprises a device responsive to randomly occurring phenomena, indicated as a conventional counter tube 10a of the type which becomes conductive when penetrated by ionizing radiation, a pulse sharpening and amplifying circuit 12a for the pulses produced by the counter 10a, an amplifier 14a and two multi-vibrator circuits 16a and 18, all connected in series for delivery to gate 6 of control pulses originating in the tube 10a. This channel includes also a "dubber" circuit 20, hereinafter described with reference to Fig. 3, which is connected to the channel in advance of the amplifier 14a and serves to introduce a pulse into the channel whenever the interval between pulses originating in tube 10a exceeds a given value. The "high" channel connected to gate 8 includes a counter tube 10b, a pulse sharpening and amplifying circuit 12b, amplifier 14b, a multivibrator circuit 16b and a second amplifier 22, the output of which controls gate 8.

A source 24 of penetrating radiation, which may be, and preferably is, a small quantity of radium, is located at a position to cause random discharge of counters 10a and 10b and thereby to initiate the control pulses for the two channels. A shield 26 of lead or the like, is positioned between the source 24 and the tube 10a to cause the average rate of generation of pulses in that counter to be less than that in counter 10b. Hence, relatively speaking, the channel controlling gate 6 has pulses impressed thereon at a "low" average rate and the channel controlling gate 8 has pulses impressed thereon at a "high" average rate.

In the operation of the system of Fig. 1, a control signal for recording by device 2 is initiated when gate 6 is opened and is terminated when gate 8 is closed, unless it is sooner terminated by closure of gate 6. The period that gate 6 remains open depends on the time constant of multi-vibrator 18 which thus controls the maximum duration of a control signal. By means of a variable capacity 28, the time constant of circuit 18, and, therefore, the maximum duration of any control signal, may be adjusted as desired. The respective time constants of multi-vibrator circuits 16a and 16b determine the minimum interval between pulses in the low and high channels respectively and variable condensers 30 and 32 are provided for respective adjustment of such time constants. The movable elements of condensers 28 and 32 of circuits 18 and 16b are preferably mechanically tied together for conjoint operation, as indicated by the dashed line 34, in order to correlate the time constants of the two circuits and permit full range of signal duration up to the maximum determined by the time constant of circuit 18.

With the system of Fig. 1 so far described, control signals of random occurrence and of random duration will be recorded by the recording device 2. The average rate of occurrence of the signals and of their duration can be controlled by varying the location of the source 24 with respect to the counter tubes 10a and 10b, or by substitution of a shield of different thickness or of a different degree of opacity to the radiations emanating from the source.

A selector 36 shown in detail in Fig. 4, permits the circuit to be readily changed, if desired, for production of signals of constant instead of random length or permits the operator to control both the length and occurrence of the signals independently of the counter tubes.

Figures 2, 3:
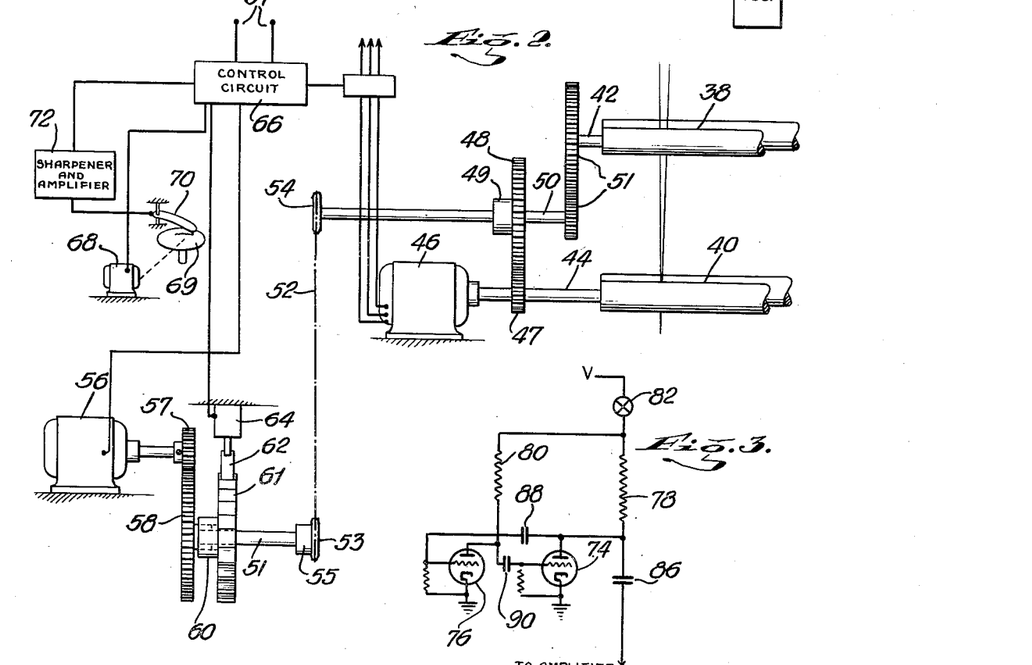
Fig. 2 is a diagram of the equipment at a controlled station.
Fig. 3 is a circuit diagram of the element of Fig. 1 which automatically introduces control signals when the interval between pulses is longer than a predetermined value.

The diagram of Fig. 2, now to be described, represents schematically the part of the system of the invention in which the recorded control signals are reproduced and utilized for control of the speed of the back rolls of a spinning frame. One unit of a conventional spinning frame is diagrammatically indicated as comprising a pair of back rolls 38 and a pair of front rolls 40. The shaft of the driven back roll is indicated at 42 and that of the driven front roll at 44. A frame motor, indicated at 46, through suitable gearing, drives the front roll shaft 44 at a relatively high rate. The motor 46 also drives the backroll shaft 42, the gearing including a drive pinion 47, which may be mounted on shaft 44, a gear 48 driven by the pinion 47 and mounted by means of an overriding clutch 49 on a stub shaft 50 and gears 51 coupling shaft 50 to shaft 42. The overriding clutch 49 is provided to permit the rate of rotation of the back rolls to be increased under control of the control signals. As will be well understood in the art, an increase in back roll speed will increase the diameter of the yarn produced by the mechanism and hence each time the speed of the back rolls is increased a slub will be inserted in the yarn, the length of the slub depending upon the length of time that the back rolls are driven at the higher speed.

In the particular embodiment of the invention illustrated in Fig. 2, the means controlled by the reproduced signals for driving the shaft 50, and therefore shaft 42 as well, independently of the frame motor 46, includes a shaft 51 which is coupled to the shaft 50 by means of a chain 52 and sprockets 53 and 54 on the shafts 51 and 50 respectively, an overriding clutch 55 being provided between the shaft 51 and sprocket 53. A motor 56, through a pinion 57 on its shaft drives a gear 58 rotatably mounted on the shaft 51 and adapted to be coupled thereto by a clutch 60. The clutch 60 has formed therewith a ratchet wheel 61 which, when held against rotation by a detent 62, prevents the clutch from coupling gear 58 to the shaft 51. A solenoid 64, when energized in response to reproduced control signals, lifts the detent 62 and thus permits the clutch 60 to couple gear 58 to the shaft 51. Details of the mechanism of clutch 60 have not been illustrated as they form no part of the present invention and as suitable clutches of the type described are available commercially, one such being known as a "single revolution clutch," manufactured by the Hilliard Corporation of Elmira, New York.

A circuit 66, the elements of which are shown in Fig. 5, controls the circuits of the clutch motor 56, the frame motor 46 and the solenoid 64. The circuit 66 and the record changer motor 68 are connected to power lines by terminals 67. In response to control signals picked up from the record 69 by a conventional pick-up device 70 and impressed upon circuit 66 after being sharpened and amplified in a network 72, the circuit 66 causes solenoid 64 to be energized for the duration of each signal. Circuit 66 also operates to open the circuits of the motors 46 and 56 in the event of failure of any part of the system or in the event that the interval between signals exceeds a predetermined value. Thus when the intervals between signals are within the desired limits, the system of Fig. 2 operates to reproduce and amplify signals recorded by the system of Fig. 1 and causes the back roll speed of the frame to be increased during each control signal, with consequent introduction into the yarn of slubs which are spaced in accordance with the intervals between signals and are of lengths corresponding to the durations of the signals.

Circuit details of the recording and reproducing parts of the system will now be described with reference to Figs. 3 to 5 inclusive.

In Fig. 3 a multi-vibrator circuit suitable for use as the "dubber" unit 20 of Fig. 1 is shown. The circuit includes a pair of tubes 74 and 76, the anodes of which are connected through resistors 78 and 80 respectively to a source of positive potential, indicated at V, through a switch 82, which is diagrammatically indicated in Fig. 1, is preferably ganged to a switch 84 in the high voltage line to the counter tubes 10a and 10b. The anode of tube 74 is connected through a condenser 86 to the input to the amplifier 14a of the "low" channel, and through a condenser 88 to the control grid of tube 76. The anode of tube 76 is connected to the control grid of tube 74 through a condenser 90 and the cathodes of both tubes are grounded. A resistor, of the order of one megohm, is connected between the control grid and the cathode of tube 74 and a resistor, of the order of fifty kilohms, is connected between the control grid and cathode of tube 76. With the above type of circuit, the tubes 74 and 76 alternately become conducting. Each time tube 74 triggers, a negative pulse appears at the anode of that tube. The rate at which such pulses appear, in the absence of a pulse impressed through condenser 86 from the "low" channel, depends upon the constants of the circuit elements. By proper selection of the circuit constants, the normal rate can be made to correspond with the longest interval desired between initiation of control signals. As the circuit will trigger when a pulse arrives through condenser 86, additional pulses are inserted into the system by the dubber circuit only when the counter tube 10a has failed to produce a pulse over a period equal to the normal time between circuit triggering as determined by the constants of the circuit. For example, if the constants of the dubber circuit are so chosen that a negative pulse would be produced once each second then if one or more pulses arrive from the counter tube 10a each second, although the dubber circuit would trigger with each pulse it would not affect the number of pulses transmitted through the low channel. Should one second elapse, however, between pulses from the counter tube, the dubber circuit would trigger at its normal rate and hence insert a pulse into the low channel and initiate a control signal.

Pulses inserted by the dubber circuit 20 and those transmitted from the counter 10a through the amplifier 12a, after amplification in amplifier 14a are impressed upon the multi-vibrator 16a which, as shown in Fig. 4, may include a double triode 92 the cathodes of which are tied together and connected through a condenser 94 to the ungrounded output terminal of amplifier 14a. The cathodes are connected to ground through an adjustable resistor 96. One control grid 98 of the double triode is connected to ground through a fixed resistor 100 and the other control grid 102 is connected through the adjustable capacity 30 to the anode associated with grid 98. A source of positive potential, indicated as B+ is connected through a common resistor 104 and respective resistors 106, 108 and 110 to each anode of the tube 92 and to the control grid 102. The capacity 30 preferably comprises an array of condensers adapted to be selectively connected into circuit by means of a movable contact arm 112.

With the above described circuit when a negative pulse appears at the cathodes of the tube 92, the cathode potential is lowered causing current to flow through the part of the tube controlled by grid 98, which, in turn, through a condenser of array 30 reduces the potential on grid 102 and causes the part of the tube controlled by grid 102 to stop passing current. The anode of the part of the tube controlled by grid 102 is connected to unit 18. Hence, a positive pulse will be transmitted to the multi-vibrator unit 18 after an interval depending upon the capacity of the particular condenser connected in circuit by the contact arm 112 of the condenser array. A second negative pulse from the amplifier 14a during the interval required for passage of the pulse through the unit 16a will have no effect and hence the unit operates to control the minimum interval between pulses.

Unit 18 is substantially similar to unit 16a but as it is to be triggered by a positive pulse, the output from unit 16a is connected to a control grid of a double triode 114 instead of to the cathodes of that tube. The adjustable capacity 28, like capacity 30, comprises a condenser array having a movable contact arm 116 for selection of the condenser to be inserted in circuit between the first anode and second control grid of the double triode of the unit.

The second anode of the double triode 114 is connected through the selector 36, when control signals of random occurrence are to be recorded, to gate 6 to cause opening thereof upon deenergization of the second half of the double triode, as hereinafter described. The length of time that gate 6 remains open is controlled by the capacity of the condenser of array 28 that is connected in circuit by the arm 116 and hence the position of that arm determines the maximum length of control signal.

The arm 116 is ganged, as indicated by the broken line 34, to an arm 118 of a condenser array comprising the adjustable capacity 32 controlling the time constant of multi-vibrator circuit 16b in the "high" channel from the counter tube 10b. Circuit 16b operates, like circuit 16a, after receipt of a negative pulse at the cathodes of the double triode 120 from amplifier 14b, to transmit a negative pulse. The condensers of arrays 32 and 28 are so selected that the minimum interval between pulses to which the circuit 16b will respond is equal to the maximum length of control signal for each position of the contact arms 116 and 118.

The second anode of the double triode 120 is connected to ground through a pair of series connected resistors 122 and 124 and the junction of these resistors is connected to the control grid of a triode 126. The cathode of triode 126 is operated at positive potential, as indicated, and the anode thereof is connected through selector 36, when signals of random length are to be recorded, to gate 8 and through a dropping resistor 128 to B+. Triode 126 is thus normally energized but is deenergized when a negative pulse, resulting from energization of the second half of double triode 120, is impressed upon its control grid.

Gate 6, in the particular embodiment of the invention shown in Fig. 4 comprises an input transformer 130 the primary of which is connected to oscillator 4, an output transformer 132 the secondary of which is connected to gate 6, and a double triode 134, the control grids of which are connected across the secondary of transformer 130 and the anodes of which are connected across the primary of transformer 132. The cathodes of the double triode 134 are connected together through a resistor 136. The midpoint of resistor 136 is connected to the mid-point of the secondary of transformer 130 and, through a resistor 138, to B+. The mid-point of the primary of transformer 132 is connected to B+ through the resistor 128 and, through selector 36 when signals of random duration are to be recorded, to the anode of tube 126. Thus when tube 126 is energized as a result of a pulse from counter 10b the potential applied to the anodes of the double triode 134 is insufficient to cause energization of that tube and hence gate 8 is closed, no voltage appearing across the secondary of transformer 132.

Gate 6 includes a pair of tetrodes 140 the second control grids of which are tied together and connected to B+ through a pair of series connected resistors 142 and 144. These grids are also connected, through selector 36, when signals of random occurrence are to be recorded, to the anode of the second half of tube 114 of circuit 18. The anode of the first half of tube 114 is connected to B+ through a resistor 146 and resistor 144 and the control grid of the second half of tube 114 is connected through a resistor 148 and resistor 144 to B+.

The secondary of transformer 132 is connected across the first grids of tubes 140. The primary of an output transformer 150 of the gate 6, which is connected across the anodes of tubes 140, has its mid-point connected to B+. The secondary of transformer 150 is connected to the recording device. Hence when the second half of the double triode 114 of circuit 18 is deenergized, as the result of a pulse produced in counter 10a or of one inserted by the dubber circuit 20 the potential applied to the second grids of tubes 140 is raised sufficiently for these tubes to pass current and energy of the frequency of oscillator 4 will be delivered to the recording device until gate 8 is closed as a result of energization of tube 126 in response to a pulse passing through the high channel, or until gate 6 is closed as a result of energization of the second half tube 114, corresponding to the restoration of that tube to normal conditions after an interval determined by the setting of arm 116 of array 28.

The selector 36, in the particular embodiment illustrated in Fig. 4, comprises a three position rotary member 154 comprising two mutually insulated arcuate conducting segments 156 and 158. When randomly occurring signals of random length are to be recorded, the rotary member 154 is in the position shown in Fig. 4, hereinafter called "position No. 1." In position No. 1 a radial extension of segment 156 engages a fixed contact strip 160 which is connected to the anode of the second half of tube 114 of the multi-vibrator circuit 18, and a radial extension of segment 158 engages a fixed contact strip 162 which is connected to B+ through the resistor 128. A fixed contact 164, connected to the second grids of tubes 140 and to resistor 142, engages the strip 156 in each position of the rotary member 154 and a similar fixed contact 166 connected to the anode of tube 126 engages strip 158 in each position of member 154. A short fixed contact 168 is connected to contact 160 and positioned for engagement by the extension of strip 156 when the member 154 is rotated counterclockwise through a definite angle into "position No. 2." In position No. 2, the connection between gate 8 and tube 126 is broken as the extension of segment 158 has moved out of engagement with fixed contact 162, but gate 6 is still under control of pulses transmitted through the "low" channel. Gate 8 thus remains open and signals of constant length but of random occurrence will be recorded; the length of the signals depending upon the setting of arm 116 of the array 28. When the member 154 is rotated counterclockwise through a further angle into "position No. 3," the connection between tube 114 and gate 6 is broken as the extension on strip 156 moves out of engagement with contact 168. A fixed contact 170, connected to ground through a resistor 172 and a manually operated switch 174, is positioned for engagement by the extension on strip 156 in position No. 3 of the rotary member 154. Switch 174 is preferably spring biased to closed position and the resistance of resistor 172 low enough to prevent energization of tubes 140. Thus in position No. 3, both channels lose control of the gates and the operator, by manipulation of switch 174 can control gate 6 and hence can control both the occurrence and the duration of the signals to be recorded. Obviously, if desired, switch 174 could be operated automatically as by a commutator or the like, for recording of signals of any predetermined sequence or pattern.

In Fig. 5, to which reference may now be had, is shown in detail the control circuit of Fig. 2 and the various elements controlled thereby in response to the signals reproduced from a record. In Fig. 5 terminals 176 are connected to the pick-up head 70 (see Fig. 2), terminals 67 are connected to a suitable power supply line, for example, 60 cycle 110 volt supply line and terminals 180 are connected to a suitable source of three phase voltage for the frame motor 46, say 500 volts. A main switch 182 when closed connects terminals 67 through suitable fuses to the record changer motor 68 and to a rectifier and filter 186 through a suitable resistor. A safety switch S is provided in the lead from the undergrounded terminal 67 to switch 182. The positive potential output lead 188 of the rectifier and filter is connected through a potential dropping resistor with the anode of a triode 190, through the winding of a relay 192 with the anode of a triode 194 and through the winding of a second relay 196 with the anode of a triode 198. Relay 192, which, as hereinafter described, is energized in response to control signals impressed upon terminals 176, controls, over a front contact, the circuit of the solenoid 64. Relay 196, which is energized so long as the interval between signals is not excessive, controls, over a front contact, the circuit of a stop motion relay 200 so as to maintain that relay normally energized. The circuit of a time delay relay 202, solenoid power relay 204, clutch motor 56 and magnetic starter 206 are all controlled by the stop motion relay 200. Time delay relay 202, which is normally deenergized, serves to delay initial energization of the solenoid power relay 204 when the system is started up. Relay 204, after its starting circuit is closed over a front contact of relay 202, picks up its armatures to close its own stick circuit over a front contact and to open the circuit of relay 202. Relay 204 over a second front contact controls the circuit of solenoid 64. Magnetic starter 206 controls the circuit of the frame motor 46, each of the terminals 180 being connected to a different armature of the starter and the leads to the motor being connected to front contacts associated with the armatures. A fourth armature, 210 of the starter is connected to the ungrounded end of the starter and to a lead 212 which, through parallel branches including normally open "jog" and "start" contacts, is connected by lead A to ungrounded terminal 67. The front contact of armature 210 is connected through series connected normally closed "jog" and "stop" contacts to the front contact of the stop relay 200, the armature of which is connected to lead A.

In order that the control circuit will respond selectively to the control signals picked up by the pick-up head 70 (see Fig. 2) and impressed upon the terminals 176, a circuit 214, comprising parallel connected inductor and condenser tuned for resonance at the frequency of the signal, is connected between the amplifier 72 and the control grid of tube 190. If the frequency of the recorded signal, that is of the oscillator 4 of Fig. 1, is say 5 kc. and the rate of reproduction is one hundredth that of recording, then the circuit 214 would be tuned to resonate at 50 cycles. Hence tube 190, when a signal is impressed on terminals 176, will follow the oscillations of the signal. A rectifier tube 216 is connected to the anode of tube 190 so as to be energized during each signal. The control grid of tube 194 is connected to the ungrounded end of the cathode resistor of tube 216 so that tube also will be energized during each control signal. The control grid of tube 198 is connected through a resistor and a front contact of an armature of relay 192 to the positive output lead 188 of rectifier 186. The control grid of tube 198 is connected also to ground through an RC circuit 218 having a time constant high enough to prevent deenergization of that tube except when the interval between signals exceeds a predetermined value.

Thus during normal operation relay 192 in the anode circuit of tube 194 pulses with the signals and relay 196 in the anode circuit of tube 198 remains energized so long as signals are reproduced at or above a given rate. During each signal solenoid 64 controlling the clutch 60 (Fig. 2) is energized, the circuit of the solenoid being from the ungrounded terminal of switch 182, through the closed contacts of relay 192, lead B, closed contacts of the power relay 204, and the solenoid winding to grounded lead C. If there is a failure in any part of the circuit or if a signal fails to appear after an interval determined by the time constant of circuit 218, relay 196 drops its armature, opening the circuit of stop motion relay 200 by breaking the connection between the lead from the ungrounded terminal of switch 182 and lead D. Deenergization of relay 200 opens the circuits of the starter 206, the clutch motor 56 and solenoid power relay 204 and closes the circuit of a stop signal lamp R. The circuit of frame motor 46 is accordingly opened at the contacts controlled by the starter 206 and the frame shuts down.

The circuit of frame motor 46 can be jogged by depression of the "jog" button but cannot be placed in running condition until control signals come through at a rate sufficient to maintain tube 198 conducting. When this occurs, a relay 200 is reenergized and the system placed in condition to be put in operation by depression of the "start" button.

One specific embodiment of the invention as applied to the control of a single spinning frame has now been described. From the description of Figs. 1 and 3 it will be apparent that provision is made for selectively recording randomly occurring signals of random or of constant duration as desired, and selectively adjusting the minimum interval between signals and the maximum duration of the signals. If desired direct recording of signals under control of the operator may be made by operation of the selector to the position No. 3 and manipulation of switch 174.

The recorded signals may be used to control one or a plurality of frames as desired, or several reproducing and control circuits of the type illustrated in Fig. 5, each responsive to a different record, could be provided at a central point and so connected to different banks of frames as to permit of selection by the operator of the particular pattern of signals for control of a particular frame or bank of frames. Such an arrangement is schematically illustrated in Fig. 6 to which reference may now be had.

Figure 6:
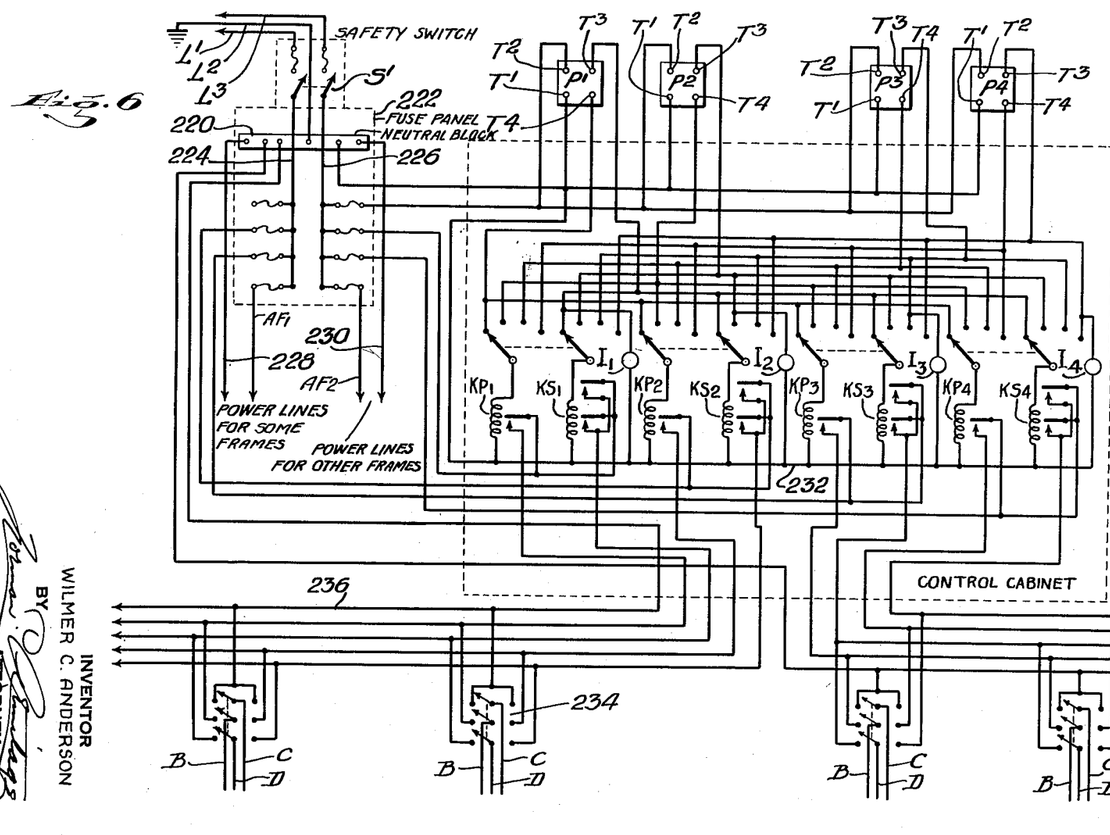
Fig. 6 is a diagram illustrating the application of the control system to a plurality of frames.

In Fig. 6 supply lines $L_1$, $L_2$ and $L_3$ for the system are shown at the upper left of the drawing. Line $L_2$ is grounded and is connected to a neutral block 220 mounted on a fuse panel 222. A double bladed safety switch S', corresponding to switch S of Fig. 5, connects lines $L_1$ and $L_3$ with leads 224 and 226 respectively. A lead 228 from the neutral block and a lead $AF_1$ connected through a fuse to lead 224, are led to the control units of half of the frames to be controlled and correspond to leads D and A respectively of Fig. 5. Similarly a lead 230 from the neutral block and a lead $AF_2$ connected to line 226, provide the power for the control units of the remainder of the frames.

Each of four terminal blocks, $P_1$, $P_2$, $P_3$ and $P_4$, one for each pattern of control signal, is provided with four terminals for connection to the associated control circuit. The control circuits and the connections therefrom to the terminal blocks are not shown in Fig. 6 but the terminals are indicated in Fig. 5 and will be readily understood from the following description. Terminal $T_1$ of each block is connected to the neutral or ground lead of the associated control circuit, terminal $T_2$ is connected to the ungrounded terminal of switch 182 (see Fig. 5) of the associated control circuit, terminal $T_3$ is connected to the front contact of the relay 196 (line D) and terminal $T_4$ is connected to a front contact of relay 192 (line B). Terminals T₁ are all connected to neutral block 220 and to a neutral lead 232. Terminals T₂ are all connected to the line 226. Terminals T₃ and T₄ of the terminal blocks are adapted to be selectively connected to four pairs of relays, $Kp_1$ and $Ks_1$; $Kp_2$ and $Ks_2$; $Kp_3$ and $Ks_3$ and $Kp_4$ and $Ks_4$ by means of eight four position switches. The movable arms of the switches for each pair of relays are ganged together, as indicated by dashed lines. Terminal T₄ of block P₁ is connected to the first position of the switches controlling the $Kp$ relays and terminal T₃ of block P₁ is connected to the first position of the switches controlling the $Ks$ relays. Similarly terminal T₄ of block P₂ is connected to the second position of the switches controlling the $Kp$ relays and terminal T₃ of block P₂ is connected to the second position of the switches controlling the $Ks$ relays. Terminals T₄ and T₃ of blocks P₃ and P₄ are similarly connected to the third and fourth positions of the switches. The $Kp$ relays thus act as repeaters for relay 192 of the particular control circuits to which they are connected and the $Ks$ relays act as repeaters for relay 196 of the particular circuits to which they are connected. One end of the winding of each relay is connected to the movable arm of the associated switch and the other end of the winding is connected to neutral line 232. These relays, together with their switches may be mounted in a suitable cabinet at a control station.

A signal lamp I₁ is connected across the first position of the switch controlling relay $Ks_1$ and the neutral lead 232 so as to be lighted whenever the control circuit associated with block P₁ is in operation. Similarly a signal lamp I₂ connected across the second position of the switch controlling $Ks_2$ and the neutral lead 232 indicates the condition of the control circuit associated with block P₂ and lamps I₃ and I₄, connected respectively to third and fourth positions of switches controlling relays $Ks_3$ and $Ks_4$ indicate when signals are available at blocks P₃ and P₄.

The controlled elements at each frame, namely the stop motion relay, clutch motor, time delay relay, solenoid power relay, solenoid and magnetic starter, are not shown in Fig. 6, but leads B, C and D for several frames are indicated along the lower part of the drawing. At each frame of one group of frames these leads are connected to the terminals of a triple-pole double throw switch 234. Lead C, at either position of the switch 234, is connected to a line 236 which is connected to the neutral block 220. When the switch 234 is thrown to the left, lead B is connected to the power line 224 through contacts controlled by relay $Kp_1$, and lead D is connected to the power line 224 through the contacts controlled by relays $Ks_1$. When the switch is thrown to the right, relays $Kp_2$ and $Ks_2$ control the connections between leads B and D and the power line. The control units at a number of frames say at thirty frames, may be similar connected through double throw switches to the power line 226 through the contacts controlled by relays $Kp_1$, $Ks_1$, $Kp_2$ and $Ks_2$. The units at the remaining frames are connected in like manner to the power line 224 through contacts controlled by relays $Kp_3$ and $Ks_3$, $Kp_4$, and $Ks_3$. Thus at the control cabinet any two patterns of control signals from the terminal blocks P₁, P₂, P₃, and P₄ can be made available to one group of frames by the switches controlling relays $Kp_1$, $Ks_1$, $Kp_2$ and $Ks_2$ and the same or different two patterns can be made available to the remaining frames by the switches controlling relays $Kp_3$, $Ks_3$, $Kp_4$ and $Ks_4$. At each frame station the operator can select, by means of the switch 234 either of the two patterns made available for that frame at the central control cabinet.

The invention has now been described with reference to a single specific embodiment as applied to the control of one or of a plurality of spinning frames. Obviously various changes in the particular circuit illustrated could be made and various parts eliminated without departing from the spirit of the invention or the scope of the appended claims. Although the invention is particularly adapted for the control of spinning frames for production of yarn having slubs therein and has been so described, other applications of the system will be apparent to those skilled in the art.

The following is claimed:

1. The method of producing a novelty yarn which comprises producing a sequence of control signals, recording the produced signals, reproducing the signals from the recording and controlling an element affecting the diameter of yarn during production in response to the reproduced signals.

2. The method of producing a novelty yarn which comprises producing a sequence of control signals at a given average rate, recording the produced signals, reproducing the signals from the recording at a lower average rate and controlling an element affecting the diameter of yarn during production in response to the reproduced signals.

3. The method of producing novelty yarn having slubs at random intervals therein which comprises utilizing inherently random phenomena to create a series of control signals, recording the created control signals, reproducing the recorded signals and controlling an element affecting the diameter of yarn during production in response to the reproduced signals.

4. The method according to claim 3 wherein the signals are reproduced at a substantially lesser rate than that at which they are recorded.

5. A system for producing a novelty yarn which comprises means for producing a sequence of control signals, means for recording the produced signals, means for reproducing the recorded signals, mechanism for affecting the diameter of yarn during production and means for controlling said mechanism in response to the reproduced signals.

6. The system according to claim 5 wherein said first mentioned means includes a source of randomly occurring pulses, a source of control signal energy, connections between said last mentioned source and the recording means, a circuit connected to receive pulses from said first mentioned source and having a definite period of response to each pulse impressed thereon, said circuit operating, except during periods of response to said pulses, to interrupt said connections to said recording means.

7. The system according to claim 6 including means for adjusting the period of response of said circuit to adjust the maximum duration of the recording of a signal.

8. The system according to claim 6 including a second circuit having a definite period of response to each pulse, said second circuit being interposed between said source of randomly occurring pulses and said first mentioned circuit to provide a minimum interval between delivery of pulses to said first mentioned circuit.

9. A system for producing a novelty yarn which comprises means for producing a sequence of control signals, means for recording the produced signals, means for reproducing the recorded signals, mechanism for affecting the diameter of yarn during production and means for controlling said mechanism in response to the reproduced signals, said first mentioned means including a source of randomly occurring pulses, a source of control signal energy, connections between said last mentioned source and the recording means, a circuit connected to receive pulses from said first mentioned source and having a definite period of response to each pulse impressed thereon, said circuit operating, except during periods of response to said pulses, to interrupt said connections to said recording means, a second source of randomly occurring pulses and means responsive to pulses from said last mentioned source for interrupting said connections to said recording means.

10. The system according to claim 9 including circuit means interposed between said second mentioned source of randomly occurring pulses and the means responsive to the pulses therefrom, said circuit means having a definite period of response to a pulse and thus providing a minimum interval between delivery of pulses to said responsive means.

11. The system according to claim 10 wherein said circuit and said circuit means are multivibrators.

12. The system according to claim 10 including means for conjointly adjusting the time constants of said circuit and said circuit means.

13. A system for producing a novelty yarn which comprises means for producing a sequence of control signals, means for recording the produced signals, means for reproducing the recorded signals, mechanism for affecting the diameter of yarn during production and means for controlling said mechanism in response to the reproduced signals, said first mentioned means including a source of randomly occurring pulses, a source of control signal energy, connections between said last mentioned source and the recording means, a circuit connected to receive pulses from said first mentioned source and having a definite period of response to each pulse impressed thereon, said circuit operating, except during periods of response to said pulses, to interrupt said connections to said recording means, a second source of randomly occurring pulses and means responsive to pulses from said last mentioned source for interrupting said connections to said recording means, means for selectively rendering said last mentioned means ineffective to interrupt said connections whereby signals of random occurrence and of constant duration may be recorded.

14. A system for producing a novelty yarn which comprises means for producing a sequence of control signals, means for recording the produced signals, means for reproducing the recorded signals, mechanism for affecting the diameter of yarn during production and means for controlling said mechanism in response to the reproduced signals, said first mentioned means including a source of randomly occurring pulses, a source of control signal energy, connections between said last mentioned source and the recording means, a circuit connected to receive pulses from said first mentioned source and having a definite period of response to each pulse impressed thereon, said circuit operating, except during periods of response to said pulses, to interrupt said connections to said recording means, a second source of randomly occurring pulses, means responsive to pulses from said last mentioned source for interrupting said connections to said recording means, means for selectively rendering said last mentioned means or both such means and said circuit ineffective to interrupt said connections, and independently operable means for interrupting said connections when the means responsive to pulses from said second source of randomly occurring pulses and said circuit are rendered ineffective to interrupt said connections.

15. A system for producing a novelty yarn which comprises means for producing a sequence of control signals, means for recording the produced signals, means for reproducing the recorded signals, mechanism for affecting the diameter of yarn during production and means for controlling said mechanism in response to the reproduced signals, said first mentioned means including a source of electrical oscillations, connections between said source and said recording means, two gate means in said connections either of which, when closed, prevents delivery of oscillations from said source to said recording means and means for controlling said gate means.

16. The system according to claim 15 wherein said last mentioned means include means for creating a sequence of randomly occurring control pulses, means responsive to such pulses for opening one of said gate means, means for creating a second sequence of randomly occurring control pulses and means responsive to pulses of said second sequence for closing the other of said gate means whereby oscillations from said source are recorded as control signals of random occurrence and of random duration.

17. The system according to claim 16 including means for maintaining said second gate means open independently of said second sequence of pulses whereby oscillations from said source are recorded as control signals of random occurrence and of constant duration.

18. The system according to claim 16 including means for adjusting the period for which said first gate means remains open after occurrence of a pulse of said first sequence.

19. A system for producing a novelty yarn which comprises means for producing a sequence of control signals, means for recording the produced signals, means for reproducing the recorded signals, mechanism for affecting the diameter of yarn during production and means for controlling said mechanism in response to the reproduced signals, said first mentioned means including a source of randomly occurring control pulses, circuit means connected thereto and responsive to said pulses, a source of control signal energy, connections between said signal energy source and said recording means controlled by said circuit means, said circuit means including at least one network having a predetermined time constant for maintaining control of said connections for a predetermined period after occurrence of a pulse, and automatic means for impressing a pulse upon said circuit means when the interval between pulses from said source of randomly occurring pulses exceeds a predetermined value.

20. A system for controlling a yarn spinning mechanism for production of yarn having slubs therein comprising in combination means for creating a sequence of control signals, circuit means responsive to the created signals, an element adapted when actuated to effect the injection of a slub into yarn being spun, said circuit means operating to actuate said element in response to the created control signals and means associated with said circuit means for stopping the yarn spinning mechanism when the intervals between successive signals exceeds a predetermined value.

21. A system for producing novelty yarn comprising in combination means for recording electrical oscillations, means for interrupting the recording at intervals to produce a record of a sequence of control signals, means for reproducing the signals from the produced record, a yarn spinning and drafting mechanism, and means responsive to the reproduced signals for changing the draft of said mechanism during each control signal, said responsive means including a circuit tuned to the frequency of the reproduced oscillations.

22. A system for producing novelty yarn comprising in combination means for recording a sequence of control signals, play-back means for reproducing the recorded signals, a yarn spinning and drafting mechanism having a driving motor therefor, an element adapted when actuated to change abruptly the draft of said mechanism, a solenoid connected with said reproducing means for actuating said element when energized in response to the reproduced signals, a stop motion relay, a normally closed energizing circuit for said relay, a time responsive device associated with said reproducing means for opening said energizing circuit of said relay when the intervals between control signals exceed a predetermined value and means responsive to deenergization of said relay for stopping said motor and preventing energization of said solenoid.

23. A system for selectively controlling a plurality of spinning frames comprising in combination, a plurality of recordings of sequences of control signals, signal reproducing means for each recording, means at each frame for changing the draft of the frame in response to control signals, and means for selectively connecting each of said last mentioned means to any one of said reproducing means.

24. A system for selectively controlling at a central location a plurality of spinning frames comprising at such location, a plurality of recordings of sequences of control signals, signal reproducing means for each recording, means at each frame for changing the draft of the frame in response to control signals, switch means at the central location for selectively preparing circuit connections between the signal responsive means of a group of frames and any group of reproducing means and switch means at each frame for selectively completing any one of the circuit connections prepared at the central location for that frame, whereby the draft of such frame may be controlled in response to signals reproduced from any one of said recordings.

WILMER C. ANDERSON.

REFERENCES CITED

The following references are of record in the file of this patent:

UNITED STATES PATENTS

| Number | Name | Date |
| --- | --- | --- |
| 2,191,185 | Wolff | Feb. 20, 1940 |
| 2,193,850 | Andrieu | Mar. 19, 1940 |
| 2,304,902 | Elvin et al. | Dec. 15, 1942 |

FOREIGN PATENTS

| Number | Country | Date |
| --- | --- | --- |
| 493,632 | Great Britain | Oct. 12, 1938 |